Nov. 27, 1934.         S. Y. RUSSELL              1,982,025
                        BORING MACHINE
                       Filed Nov. 14, 1932
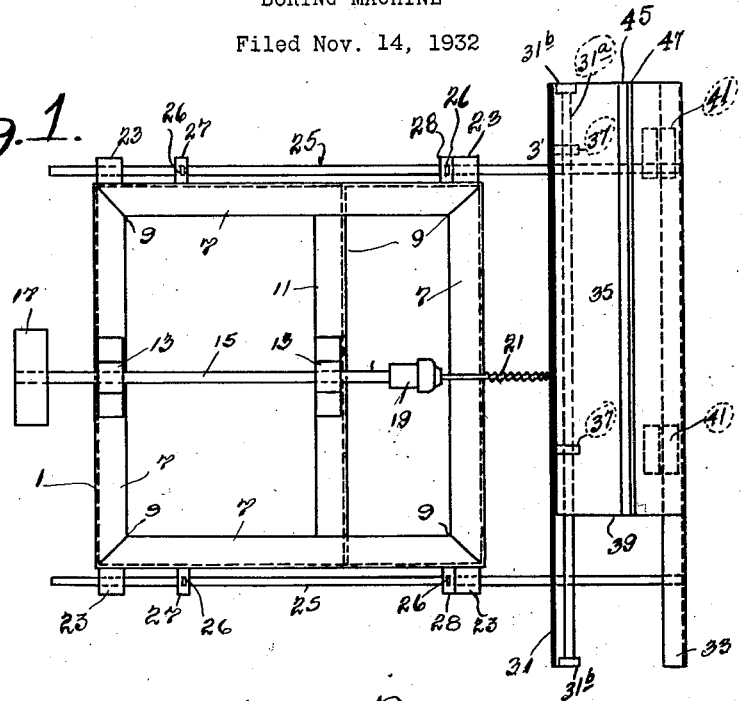
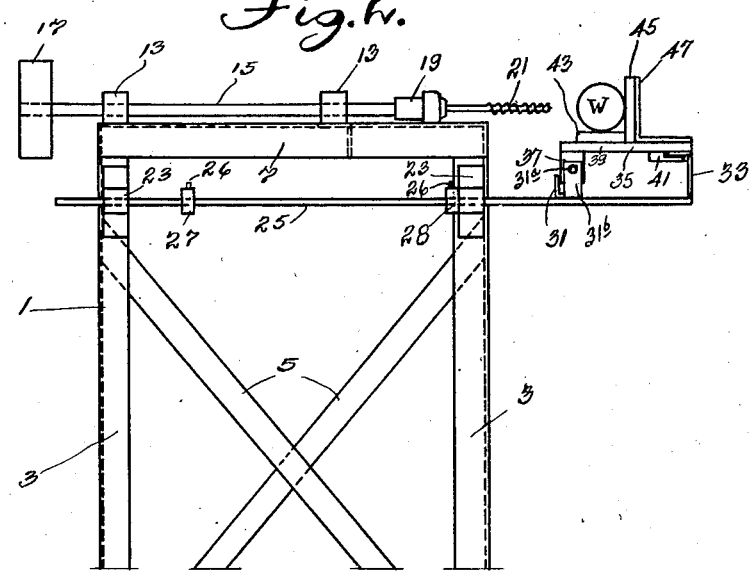
S. Y. Russell
INVENTOR
BY Milo B. Stevens & Co.
His ATTORNEY Patented Nov. 27, 1934

1,982,025

UNITED STATES PATENT OFFICE 1,982,025

BORING MACHINE

Stephen Y. Russell, Okmulgee, Okla., assignor to Adlai S. Baker, Okmulgee, Okla.

Application November 14, 1932, Serial No. 642,652

6 Claims. (Cl. 144—92)

My invention relates to boring machines, more particularly to that type of machine that is adapted to bore holes in round or angularly shaped posts for chairs, though susceptible of other uses and capable of being used to bore materials other than wood.

An object of this invention is to provide a machine of this sort in which the structure is simple and which can be cheaply and readily constructed at a low cost but which will be strong and sturdy in use.

Another object of this invention is to provide a device of this sort in which the boring mechanism does not reciprocate, the work being reciprocated instead.

A further object is to provide a boring machine in which the work is supported on a platform which is capable of being reciprocated in two directions in a horizontal plane.

A further object is to provide such a machine in which the depth of the hole to be bored can be regulated as desired to suit the type and size of work.

Other objects and advantages reside in the particular structure of my invention, combination and arrangement of the various parts and in certain modes of operation which will be readily apparent to those skilled in the art upon reference to the drawing in connection with the detailed description forming a part of this application.

To illustrate my invention attention is directed to the drawing, in which:

Figure 1 is a plan view of the device, and

Figure 2 is a side view thereof, showing a piece of work supported on the reciprocating platform.

In the drawing, wherein like reference characters have been used throughout to designate like parts, 1 indicates generally a table having legs 3, braces 5 and leg connecting top members 7. The top members 7 are four in number and connect the legs 3 together at their upper ends, said top members at their meeting points having suitable joints 9. Two of the top members 7 are further connected together at a point nearer one end than the other by a cross piece 11. All of the members 3, 7, and 11 are preferably formed of angle iron and the braces 5 are of flat iron. Obviously however, other material might be used without departing from the spirit of the invention.

The cross piece 11 and one of the parallel top members 7 are provided with bearings 13 in which the shaft 15 of the boring mechanism is journaled. The shaft 15 is provided at one end with means 17 for attachment to a source of power (not shown) and at the other end with the usual chuck 19 in which a suitable boring tool 21 is removably fixed. To prevent end thrust, thrust bearings might be substituted for bearings 13, or set collars might be attached to the shafts 15.

Adjacent the tops of the legs 3 are bearings 23 in which the shafts 25 of the work supporting carriage 35 are slidably mounted for adjustment of the carriage 35 toward and away from the boring member 21 which projects past the edge of the table. The shafts 25 are provided with adjustable stops 27 and 28 for limiting the forward and backward movement of the carriage 35. The adjustment of the stops 27 and 28 is accomplished by loosening the set screws 26 thereon and sliding the stops along the shafts 25 to the desired positions.

As is readily apparent from the drawing, the shafts 25 project some distance from one edge of the table 1 below the plane of tool 21, and are there connected together by the members 31 and 33, preferably of angle iron. The member 33 and a rod 31a carried by the member 31 slidably support the carriage 35 and serve as tracks for the lateral adjustment of the carriage. The member 31 is L-shaped and the base of the L carries brackets 31b that support the rod 31a while the back of the L acts as a guide for the lugs 37 which project downwardly from the floor 39 of the carriage 35 and which slidably receives the rod 31a as shown. The second track member 33 is of inverted L-shape and the outer surface of the base of the L slidably engages the lower surface of the floor 39 while suitable keepers 41, also L-shaped, project downwardly from the floor 39 and engage the inner surface of the base of the inverted L-shaped member 33. By referring to Figure 2, it can readily be seen that the arrangement of the members 31, 31a and 33 with the guides 37 and 41 permit the carriage 35 to be moved laterally of the boring member 21 while at the same time accidental jumping of the track by the carriage is guarded against.

From the foregoing it is apparent that the carriage 35 is movable towards the boring tool 21 on the shafts 25 and laterally of the said tool on the track members 31a and 33.

The work W is supported by the floor piece 43 which rests on the floor 39. For want of space the work and this piece are not shown in Figure 1. This floor piece is removable and similar pieces of various thicknesses may be provided so that pieces of work of varying sizes may be adjusted vertically with respect to the tool 21. A backing member 45 serves to retain the work W on the floor piece 43 and is affixed to the back of an L-shaped beam 47 which is attached to the top of the floor 39. The beam 47 is preferably formed of angle iron but the backing member 45 should be made of wood or like material to protect the point of the boring member 21 when the work W has been bored through.

From the foregoing it is apparent that my device is very simple in structure and operation, the operator merely slides the carriage to the right or left or to or from the boring tool until the required number of holes have been bored. A scale may be provided on the floor 39 in front of the floor piece 43 to aid in correctly spacing the holes and a height gauge might be affixed to the backing member 45 to aid in the vertical adjustment of the work but I do not limit myself to any particular form of scale or gauge as such devices are well known in the art.

Having thus described my invention, what I believe to be new and useful and desire to secure by Letters Patent is:

1. A device for boring holes in fence posts or the like, comprising a frame, legs supporting the frame, top members connecting the upper ends of the legs, a cross piece connecting two of the top members, bearings carried by the cross piece and one of the top members, a shaft rotatably mounted therein, power attachment means at one end of said shaft, a chuck for the support of a boring tool at the other end of the shaft, aligned bearing members adjacent the tops of the legs, a pair of parallel shafts slidably mounted in said bearings and projecting a substantial distance past one edge of the frame, adjustable stops on the shafts to limit sliding movement of the shafts in both directions, an inverted L-shaped member connecting the projecting ends of said shafts, a second L-shaped member connecting said shafts inwardly of said first named member and parallel to the same, a rod carried by said second L-shaped member, and a work supporting carriage slidably mounted for lateral movement on said rod and said inverted L-shaped member.

2. A device for boring holes in fence posts or the like comprising a frame, legs supporting the frame, top members connecting the upper ends of the legs, a cross piece connecting two of the top members, bearings carried by the cross piece and one of the top members, a shaft rotatably mounted therein, power attachment means at one end of said shaft, a chuck for the support of a boring tool at the other end of the shaft, aligned bearing members adjacent the tops of the legs, a pair of parallel shafts slidably mounted in said bearings and projecting a substantial distance past one edge of the frame, adjustable stops on the shafts to limit sliding movement of the shafts in both directions, an inverted L-shaped member connecting the projecting ends of said shafts, a second L-shaped member connecting said shafts inwardly of said first named member and parallel to the same, a rod carried by said second L-shaped member, a work supporting carriage slidably mounted for lateral movement on said rod and said inverted L-shaped member, and means on said carriage for vertically adjusting the work with respect to the boring tool.

3. A boring machine comprising a frame having supporting legs and a top, a boring tool rotatably mounted on the top and projecting outwardly of the edge of the frame, aligned bearings on said legs adjacent said top, shafts slidably mounted in said bearings and projecting outwardly of said frame on a lower plane than said boring tool, means for limiting the sliding movement of said shafts, an inverted L-shaped member connecting the projecting ends of said shafts, a second L-shaped member connecting said shafts inwardly of said first named member, a rod carried by said second L-shaped member, a work supporting carriage, L-shaped guides depending from one side of said carriage and adapted to slidably engage the base of said inverted L-shaped member between said guides and said carriage, guides depending from the other side of said carriage and adapted to fit on said rod and means on said carriage for adjustably supporting a piece of work.

4. A boring machine comprising a frame, a boring tool rotatably mounted on the top of said frame and projecting outwardly of one edge thereof, shafts slidably mounted on said frame and projecting outwardly thereof beneath the plane of said tool, an inverted L-shaped member connecting the projecting ends of said shafts, a second L-shaped member connecting said shafts inwardly of said first L-shaped member, a rod carried by said second L-shaped member, and a work supporting carriage slidably mounted for lateral movement on said rod and said inverted L-shaped member.

5. A boring machine comprising a frame, a boring tool rotatably mounted on the top of said frame and projecting outwardly of one edge thereof, shafts slidably mounted on said frame and projecting outwardly thereof beneath the plane of said tool, an inverted L-shaped member connecting the projecting ends of said shafts, a second L-shaped member connecting said shafts inwardly of said inverted member, a rod carried by said second L-shaped member, a work supporting carriage, and separate depending means on the lower side of said carriage for slidingly engaging the base of said inverted L-shaped member and said rod.

6. A boring machine comprising a frame, a boring tool rotatably mounted on the top of said frame and projecting outwardly of one edge thereof, shafts slidably mounted on said frame and projecting outwardly thereof beneath the plane of said tool, an inverted L-shaped member connecting the projecting ends of said shafts, a second L-shaped member connecting said shafts inwardly of said inverted member, a rod carried by said second L-shaped member, a work supporting carriage, L-shaped guides depending from said carriage adjacent one side thereof and positioned to slidably retain the base of said inverted L-shaped member between said guides and said carriage, and guides depending from the other side of said carriage and adapted for a sliding engagement with said rod.

STEPHEN Y. RUSSELL